(12) United States Patent
Li et al.

(10) Patent No.: US 11,251,942 B2
(45) Date of Patent: Feb. 15, 2022

(54) SECURE COMMUNICATION CHANNEL BETWEEN ENCRYPTION/DECRYPTION COMPONENT AND TRUSTED EXECUTION ENVIRONMENT

(71) Applicant: Alibaba Group Holding Limited, Grand Cayman (KY)

(72) Inventors: Xiaoning Li, Bellevue, WA (US); Li Shen, Bellevue, WA (US); Yanhui Zhao, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 316 days.

(21) Appl. No.: 16/243,347

(22) Filed: Jan. 9, 2019

(65) Prior Publication Data

US 2020/0220713 A1 Jul. 9, 2020

(51) Int. Cl.
*H04L 9/08* (2006.01)
*H04L 9/14* (2006.01)
*H04L 9/32* (2006.01)

(52) U.S. Cl.
CPC .............. *H04L 9/083* (2013.01); *H04L 9/14* (2013.01); *H04L 9/3234* (2013.01)

(58) Field of Classification Search
CPC ......... H04L 9/083; H04L 9/14; H04L 9/0897; H04L 63/06; H04L 9/3234
USPC ......................................................... 713/155
See application file for complete search history.

(56) References Cited

U.S. PATENT DOCUMENTS

| | | | |
|---|---|---|---|
| 7,603,550 B2 | 10/2009 | McGrath et al. | |
| 7,616,653 B1 * | 11/2009 | Droux ................... | H04L 69/324 370/420 |
| 7,702,739 B1 * | 4/2010 | Cheng ................... | H04L 67/327 709/207 |
| 8,935,746 B2 | 1/2015 | Vetillard | |
| 9,049,597 B2 | 6/2015 | Belrose et al. | |
| 9,118,639 B2 | 8/2015 | Phegade et al. | |

(Continued)

OTHER PUBLICATIONS

"Introduction to Intel Software Guard Extensions (Intel SGX)", retrieved from the internet on Jan. 9, 2019 at <<https://software.intel.com/sites/default/files/managed/81/61/intel-sgx-webinar.pdf>>, 38 pages.

(Continued)

*Primary Examiner* — Bryan F Wright
(74) *Attorney, Agent, or Firm* — Lee & Hayes, P.C.

(57) ABSTRACT

Techniques for establishing a secure communication channel between a trusted portion of a system and another portion of the system and providing data over the secure communication channel are described herein. For example, a system may implement a Trusted Execution Environment (TEE) and a TEE component associated with the TEE. The TEE component may establish a secure communication channel with a Network Interface Controller (NIC) on the system, such as a smart NIC that is configured to encrypt/decrypt data and/or perform other operations. The TEE component may receive one or more cryptographic keys from a service provider and provide the one or more cryptographic keys to the NIC via the secure communication channel. The NIC may use the one or more cryptographic keys to encrypt data to send to another device, decrypt data that is received from another device, or otherwise encrypt/decrypt data.

20 Claims, 6 Drawing Sheets

(56) References Cited

U.S. PATENT DOCUMENTS

| | | |
|---|---|---|
| 9,317,689 B2 | 4/2016 | Aissi |
| 9,413,538 B2 | 8/2016 | Baumann et al. |
| 9,558,358 B2 | 1/2017 | Aissi et al. |
| 9,560,078 B2 | 1/2017 | Sood et al. |
| 9,742,559 B2 | 8/2017 | Christodorescu et al. |
| 9,756,066 B2 | 9/2017 | Gupta et al. |
| 10,367,840 B2 | 7/2019 | Sood |
| 10,496,824 B2 | 12/2019 | Raj |
| 2005/0141525 A1* | 6/2005 | Rose ................... H04L 67/14 370/401 |
| 2008/0130895 A1 | 6/2008 | Jueneman et al. |
| 2013/0281058 A1 | 10/2013 | Obaidi et al. |
| 2016/0182499 A1* | 6/2016 | Sharaga ............ H04L 63/0823 713/156 |
| 2016/0277439 A1 | 9/2016 | Rotter et al. |
| 2017/0264570 A1* | 9/2017 | Bugenhagen ......... H04L 45/66 |
| 2020/0127981 A1* | 4/2020 | Yang ................... H04L 9/3268 |

OTHER PUBLICATIONS

PCT Search Report and Written Opinion dated Apr. 2, 2020 for PCT Application No. PCT/US2020/012796, 9 pages.

* cited by examiner

SECURE COMMUNICATION CHANNEL BETWEEN ENCRYPTION/DECRYPTION COMPONENT AND TRUSTED EXECUTION ENVIRONMENT

BACKGROUND

Smart Network Interface Controllers (NICs) have recently been developed to offload processing that is generally performed by a Central Processing Unit (CPU). For example, a device may include a smart NIC to perform network traffic processing that was historically performed by a CPU. In some examples, smart NICs are implemented within the context of a cloud environment, where multiple servers operate in a group to perform functions. Such servers often process or communicate sensitive information, such as user data, passwords, etc. However, when the sensitive data is exchanged between a CPU and a smart NIC and/or between servers, the data may be compromised due to security attacks.

SUMMARY OF INVENTION

This disclosure is directed to establishing a secure channel between a trusted portion of a system and another portion of the system and providing sensitive data over the secure channel. For example, a system may implement a Trusted Execution Environment (TEE). The hardware and/or software that implement the TEE and/or that are executed within the TEE may be referred to as a TEE component. The TEE component may establish a secure communication channel with a component on the system, such as a smart Network Interface Controller (NIC) that is configured to encrypt/decrypt data and/or perform other operations.

DETAILED DESCRIPTION

Figure 1:
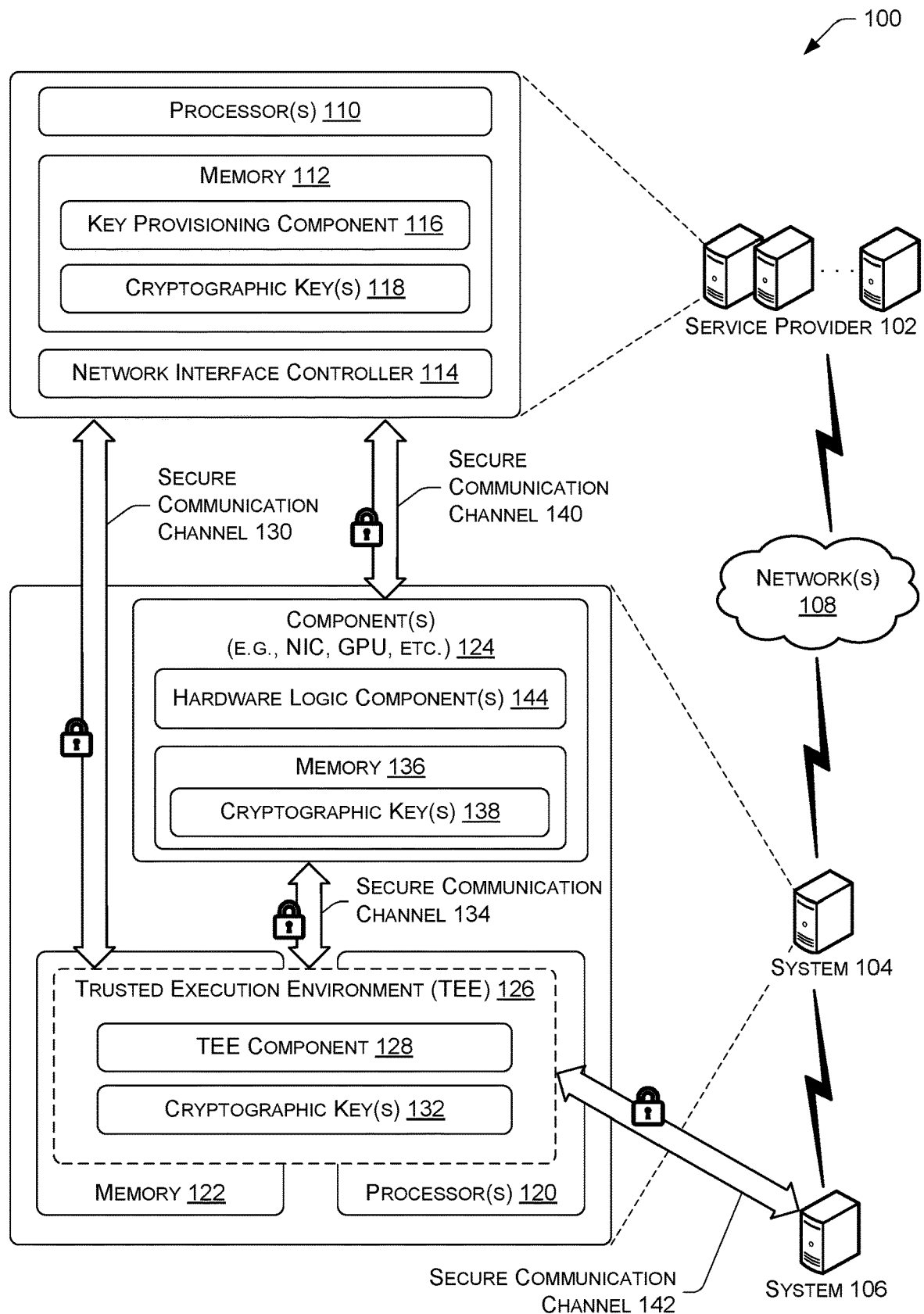
FIG. 1 illustrates an example environment in which techniques described herein may be implemented.

The TEE component may receive one or more cryptographic keys from a service provider and provide the one or more cryptographic keys to the component via the secure communication channel. The component may use the one or more cryptographic keys to encrypt data before it is sent to another device, decrypt data that is received from another device, or otherwise encrypt/decrypt data.

To illustrate, a service provider may provision one or more cryptographic keys in a secure manner to a system (e.g., a computing device). For example, the system may implement a TEE component to perform a variety of operations in a secure environment. In examples, the TEE component may perform attestation (e.g., remote attestation) with the service provider to establish a first secure communication channel. Communications over the first secure communication channel may be encrypted with a session cryptographic key. The service provider may then provide a message (e.g., key package) to the TEE component over the first secure communication channel. The message may include one or more cryptographic keys that may be used by a component of the system. The message may be encrypted with the session cryptographic key. In examples, the message also includes map data indicating cryptographic keys to use to communicate with other systems. The TEE component may decrypt the message with the session cryptographic key to identify the one or more cryptographic keys, the map data, and/or any other data that is part of the message.

The TEE component may provision (e.g., provide) the one or more cryptographic keys to one or more components of the system. For example, the TEE component may establish a second secure communication channel with a smart NIC on the system. To do so, the TEE component and/or the NIC may exchange data and verify the exchanged data with a cryptographic key or other data previously stored in the TEE component and/or NIC, such as during configuration. When exchanging data to establish the second secure communication channel, the TEE component and/or the NIC may designate a cryptographic key to use for communication (e.g., a cryptographic key to encrypt data with). The TEE component may then provide a message to the NIC that includes the one or more cryptographic keys and/or the map data that originated from the service provider. The message may be encrypted with the cryptographic key designated for the second secure communication channel. The NIC may decrypt the message with the cryptographic key to identify the one or more cryptographic keys and/or the map data within the message.

The NIC may then use the one or more cryptographic keys and/or the map data to encrypt/decrypt data. For example, the NIC may receive data from the TEE component via the second secure communication channel. The NIC may encrypt the data based on a cryptographic key of the one or more cryptographic keys that originate from the service provider. The NIC may then send the encrypted data to the service provider, another system, or any other device. In examples, the NIC may use the map data to identify which cryptographic key to use when encrypting the data (e.g., to select a cryptographic key that is designated for communication between the system and the specific receiving device).

In examples, the techniques discussed herein may enable a component of a system to receive data in a secure manner. For instance, a TEE component of a system may receive a cryptographic key from a service provider and securely provision the cryptographic key to a component of the system, such as a NIC or another component. In examples, the component may verify that the TEE component is a trusted entity and receive the cryptographic key based on such verification. In examples, the techniques may allow the component to receive data from a service provider in a secure manner when the component does not otherwise have secure access to the service provider. Although many examples are discussed as being performed with a NIC, the techniques may be implemented with any component, such as a Graphics Processing Unit (GPU), a secure cryptoprocessor, a video card, a digital signal processor, a camera, an audio codec, etc.

In examples, the techniques are implemented in the context of a group of computing devices, such as a cloud computing architecture. For instance, the techniques may be used within a group of servers to exchange data in a secure manner (e.g., a first server may use a cryptographic key provided by a service provider to communicate with a second server without compromising data). In other examples, the techniques are implemented in other contexts, such as between client devices, between a client device and a server, and/or between other types of devices.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are only examples of many.

Example Environment

FIG. 1 illustrates an example environment 100 in which the techniques described herein may be implemented. The environment 100 includes a service provider 102 to communicate with a system 104 to provide one or more cryptographic keys to the system 104. The system 104 may use a cryptographic key to communicate with the service provider 102 and/or a system 106. In examples, the service provider 102 and the system 104 (and/or the system 106, in some cases) may communicate via a network(s) 108.

The service provider 102 may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like.

The one or more computing devices of the service provider 102 may include a processor(s) 110, memory 112, and a Network Interface Controller (NIC) 114. The processor(s) 110, the memory 112, and/or the NIC 114 may be communicatively coupled to each other. The processor(s) 110 may include, for example, one or more microprocessors, one or more microcomputers, one or more microcontrollers, one or more digital signal processors, one or more Central Processing Units (CPUs), one or more Graphics Processing Units (GPUs), one or more security processors (e.g., secure cryptoprocessors), etc.

The memory 112 may include a key provisioning component 116 to provision a cryptographic key(s) 118. The key provisioning component 116 may generate the cryptographic key(s) 118 using any type of algorithm, such as a key derivation function or another algorithm. The cryptographic keys(s) 118 may be stored in the memory 112. The key provisioning component 116 may provide one or more of the cryptographic key(s) 118 to the system 104, the system 106, and/or another system. The key provisioning component 116 may represent executable instructions that when executed by the processor(s) 110, cause the processor(s) 110 to perform operations.

The service provider 102 may implement the NIC 114 to communicate with another device, such as via the network(s) 108. The NIC 114 may include electronic circuitry to send/receive data wirelessly and/or via a cable (e.g., Ethernet, optical channel, etc.). The NIC 114 may be implemented as one or more hardware logic components, such as one or more processors, a System on a Chip (SoC), an Application-Specific Integrated Circuit (ASIC), Field-Programable Gate Array (FPGA), and so on. Additionally, or alternatively, the NIC 114 may include memory.

In examples, the NIC 114 is implemented as a smart NIC configured to perform various operations, such as encryption/decryption, controlling traffic (e.g., steering), implementing a firewall, reporting traffic flow, etc. The NIC 114 may perform such operations independently of operations performed by the processor(s) 110 (e.g., may not take a CPU cycle). In examples, the NIC 114 may add an additional layer of encryption to data that is sent from the service provider 102. For instance, the NIC 114 may receive data from the key provisioning component 116 or any other component, encrypt the data (even if the data is already encrypted at a higher layer, such as an application layer), and send the encrypted data via the network(s) 108. In a similar manner, the NIC 114 may decrypt data that is received via the network(s) 108.

The system 104 and/or the system 106 may each include any one of a variety of computing devices, such as a server, a laptop computer, a desktop computer, a smart phone, a mobile phone, a personal digital assistant (PDA), an electronic book device, a tablet computer, a portable computer, a gaming device, a personal media player device, or any other computing device. In some examples, the system 104 and/or the system 106 may be configured in a cluster, data center, cloud computing environment, or a combination thereof. In one example, the system 104 and/or the system 106 provide cloud computing resources, including computational resources, storage resources, and the like to a remote device, such as a client device.

The system 104 may include a processor(s) 120, memory 122, and a component(s) 124. The processor(s) 120, the memory 122, and/or the component(s) 124 may be communicatively coupled to each other. The processor(s) 120 may include, for example, one or more microprocessors, one or more microcomputers, one or more microcontrollers, one or more digital signal processors, one or more Central Processing Units (CPUs), one or more Graphics Processing Units (GPUs), one or more security processors (e.g., secure cryptoprocessors), etc.

In the example of FIG. 1, the processor(s) 120 and/or the memory 122 may implement a Trusted Execution Environment (TEE) 126. The TEE 126 may include an isolated region of the memory 122 (sometimes referred to as an enclave) and/or a secure portion of the processor(s) 120. The TEE 126 may enable instructions to be executed and/or data to be stored in a secure manner The TEE 126 may provide a higher level of attacks than a general-purpose operating system, for example.

The hardware and/or instructions that implement the TEE 126 and/or that are executed within the TEE 126 may be referred to as a TEE component 128. In examples, an application (or instructions) may include a portion that is implemented outside the TEE 126 (e.g., within a non-secure portion of main memory and/or with general CPU instructions) and/or a portion that is implemented within the TEE 126 (e.g., within a secure portion of main memory and/or with specific CPU instructions). For instance, the system 104 may execute an application to perform a function. Here, the processor(s) 120 may execute a first portion of the application that does not relate to sensitive data or algorithms outside of the TEE 126 and execute a second portion of the application that relates to sensitive data or algorithms inside the TEE 126. In examples, sensitive data is only decrypted/encrypted and/or processed inside the TEE 126.

In examples, the TEE component 128 may perform attestation (e.g., remote attestation) with the service provider 102 to establish a secure communication channel 130. Remote attestation may be a process by which a device authenticates its hardware/software configuration to a remote device. In examples, the service provider 102 and/or the TEE component 128 may communicate with an attestation service, such as a third-party service not illustrated in FIG. 1. While performing attestation, the TEE component 128 and/or the service provider 102 may designate a cryptographic key to use for communication (e.g., a cryptographic key associated with the secure communication channel 130). That is, communications that are sent/received via the secure communication channel 130 may be encrypted/decrypted with the cryptographic key.

Upon establishing the secure communication channel 130, the service provider 102 may send a message (e.g., key package) to the TEE component 128 that includes map data and/or one or more cryptographic keys, such as the cryptographic key(s) 118. The message may be encrypted with the cryptographic key associated with the secure communication channel 130. The TEE component 128 may decrypt the message to identify the map data and/or the one or more cryptographic keys in the message. The map data and/or the one or cryptographic keys may be stored in the TEE 126 (e.g., stored in an isolated region of the memory 122 as a cryptographic key(s) 132). The one or more cryptographic keys received from the service provider 102 may include cryptographic keys that the component(s) 124 may use when communicating with the service provider 102, the system 106, and/or another system.

Map data may generally indicate a mapping of cryptographic keys to systems. For example, the map data may indicate that the component(s) 124 should encrypt/decrypt data with a first cryptographic key when communicating with a first system and should encrypt/decrypt data with a second cryptographic key when communicating with a second system. In examples, the first cryptographic key and/or the second cryptographic key may be an ephemeral key.

The TEE component 128 may also establish a secure communication channel 134 with the component(s) 124. For example, the TEE component 128 and/or the component(s) 124 may exchange data and verify the exchanged data with a cryptographic key or other data previously stored in the TEE component 128 and/or the component(s) 124, such as during configuration, as discussed in below. While exchanging data to establish the secure communication channel 134, the TEE component 128 and/or the component 124 may designate a cryptographic key to use for communication.

The TEE component 128 may then provide a message to the component(s) 124 via the secure communication channel 134. The message (e.g., key package) may include map data and/or one or more cryptographic keys that originated from the service provider 102, such as the cryptographic key(s) 118. The message may be encrypted with the cryptographic key associated with the secure communication channel 134. The component(s) 124 may decrypt the message to identify the map data and/or the one or more cryptographic keys in the message. The component(s) 124 may store the map data and/or the one or more cryptographic keys in memory 136 (e.g., as a cryptographic key(s) 138).

The component(s) 124 may use the cryptographic key(s) 138 and/or the map data stored in the memory 136 to encrypt/decrypt data and/or perform a variety of other operations. In one example, the component(s) 124 may receive data from the TEE component 128 via the secure communication channel 134. The component(s) 124 may encrypt the data based on at least one of the cryptographic key(s) 138. The component(s) 124 may then send the encrypted data to the service provider 102, the system 106, or another device. In another example, data may be received from the service provider 102, the system 106, and/or another device and decrypted based on the cryptographic key(s) 138. When communication with another device is encrypted, such communication may be referred to as being over a secure communication channel. For example, data that is sent to or received from the service provider 102 may be over a secure communication channel 140, while data that is sent to or received from the system 106 may be over a secure communication channel 142.

In examples, the system 104 and/or the system 106 may be configured in a group and operate in cooperation to perform one or more operations (e.g., in a cloud environment). Here, the techniques discussed herein may be implemented to enable the system 104 to communicate with the system 106 and/or another system in the group in a secure manner. For example, the techniques may enable the component(s) 124 to receive one or more cryptographic keys in a secure manner to encrypt/decrypt communications sent/received by the system 104. In examples, the component(s) 124 may use map data to identify which cryptographic key to use when communicating with a particular system in the group. In other words, the component(s) 124 may use the map data to select a cryptographic key that is designated for communication between the system 104 and the particular system. By encrypting communications between systems in the group and/or assigning different cryptographic keys, the techniques may ensure that sensitive data remains protected within the group of systems. Although two systems are illustrated in FIG. 1, any number of systems may be implemented, such as five, ten, twenty, thirty, and so on.

The component(s) 124 may include a Network Interface Controller (NIC) (e.g., a smart NIC, a general purpose NIC, etc.), a Graphics Processing Unit (GPU), a secure cryptoprocessor, a video card, a digital signal processor, a camera, an audio codec, etc. The component(s) 124 may be implemented with a hardware logic component(s) 144 and/or the memory 136. The hardware logic component(s) 144 may be one or more processors, a System on a Chip (SoC), an Application-Specific Integrated Circuit (ASIC), a Field-Programable Gate Array (FPGA), and so on. In examples, the memory 136 may be part of the hardware logic component(s) 144.

In one example, the component(s) 124 may be implemented as a NIC to communicate with another device, such the service provider 102, the system 106, etc. The NIC may include electronic circuitry to send/receive data wirelessly and/or via a cable (e.g., Ethernet, optical channel, etc.). In examples, the NIC is implemented as a smart NIC configured to perform various operations, such as encryption/decryption, controlling traffic (e.g., steering), implementing a firewall, reporting traffic flow, etc. The NIC may perform such operations independently of operations performed by the processor(s) 120 (e.g., may not take a CPU cycle). In examples, the NIC may add an additional layer of encryption to data that is sent from the system 104. For instance, the NIC may receive data from the TEE component 128 or any other component, encrypt the data (even if the data is already encrypted at a higher layer, such as an application layer), and send the encrypted data. In a similar manner, the NIC may decrypt data that is received at the system 104.

The memory 112, the memory 122, the memory 136, and/or any other memory described herein are examples of computer-readable media. Computer-readable media may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals, carrier waves, and/or signals.

The network(s) 108 may include a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a Mobile Telephone Network (MTN), or other various communication technologies. The network(s) 108 may include wireless and/or wired connections.

Although not shown in FIG. 1, the system 106 may include the same or similar components and/or implement the same or similar functionality as the system 104. For example, the components illustrated in FIG. 1 for the system 104 may be representative of the components of the system 106.

In examples, during an initialization stage, the component(s) 124 (e.g., a NIC) may be configured to communicate with just the service provider 102 due to a static cryptographic key (sometimes referred to as "original static key") being designated for communication between the component(s) 124 and the service provider 102. The static cryptographic key (original static key) may be stored by the component(s) 124 and the service provider 102 during a configuration stage. Further, during the initialization stage, the TEE component 128 and the service provider 102 may perform remote attestation to verify that each other are trusted, which may include communicating with an attestation service (e.g., a third-party service). While performing remote attestation, the TEE component 128 and the service provider 102 may negotiate a session cryptographic key (sometimes referred to as "sk") to send/receive a key package including one or more cryptographic keys that may be used to communicate with various systems. Once the key package is received, the TEE component 128 may forward those one or more cryptographic keys onto the component(s) 124, so that the system 104 is able to communicate with various systems that also have the one or more cryptographic keys.

In examples, cryptographic keys are updated periodically, upon the occurrence of an event (e.g., booting up, etc.), upon request by the system 104, and so on. In one example, the service provider 102 may periodically or at any other time provide an updated static cryptographic key (also referred to as a rotated static key) to the system 104 to use when communicating with the service provider 102. In another example, the service provider 102 may periodically or at any other time provide an updated dynamic cryptographic key (also referred to as an ephemeral cryptographic key) to the system 104 to use when communicating with the system 106.

Example Processes

FIGS. 2-6 illustrate example processes 200, 300, 400, 500, and 600 for employing the techniques described herein. For ease of illustration, the processes 200, 300, 400, 500, and 600 are described as being performed in the environment 100 of FIG. 1. For example, one or more of the individual operations of the processes 200, 300, 400, 500, and 600 may be performed by the service provider 102, the system 104, and/or the system 106. However, the processes 200, 300, 400, 500, and 600 may be performed in other environments. Moreover, the environment 100 may be used to perform other processes.

The processes 200, 300, 400, 500, and 600 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, configure the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the process. Further, any of the individual operations may be omitted.

Figure 2:
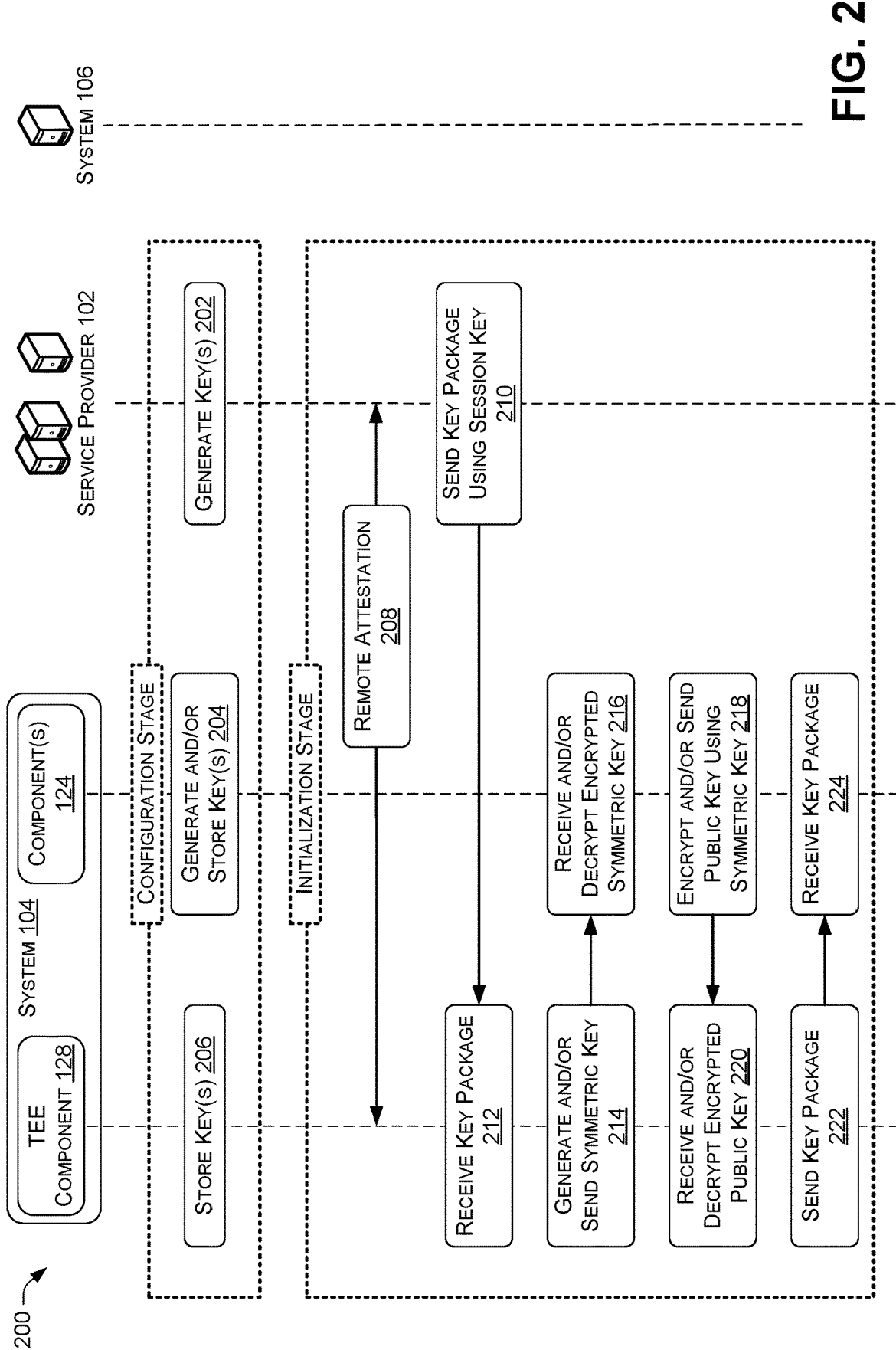
FIG. 2 illustrates an example process to establish a secure channel between a trusted portion of a system and another portion of the system and provide data over the secure channel.

FIG. 2 illustrates an example process 200 to establish a secure channel between a trusted portion of a system and another portion of the system and provide data over the secure channel. For ease of illustration, the term "key" is used in FIG. 2 to represent a cryptographic key.

At 202, the service provider 102 may generate a cryptographic key(s), such as the cryptographic key(s) 118. For example, the service provider 102 may generate a key pair including a private cryptographic key (sometimes referred to as "SP_private_key") and a public cryptographic key (sometimes referred to as "SP_public_key"). The service provider 102 may also generate a static cryptographic key (sometime referred to as "original static key"). In examples, the static cryptographic key may be used when communicating with the component(s) 124 for the first time. The cryptographic key(s) may be stored at the service provider 102.

At 204, the component(s) 124 may generate and/or store a cryptographic key(s), such as the cryptographic key(s) 138. For example, the component(s) 124 may generate and/or store a key pair including a private cryptographic key (sometimes referred to as "NIC_private_key") and a public cryptographic key (sometimes referred to as "NIC_public_key"). In examples, the component(s) 124 may associate (e.g., register) the public cryptographic key to the service provider 102. The service provider 102 may maintain a record of a public cryptographic key for each component in a group (e.g., a public cryptographic key for each NIC in a group of systems).

At 204, the component(s) 124 may also store the static cryptographic key (original static key) and/or the public key generated at the service provider 102 (SP_public_key). In examples, the static cryptographic key (original static key) and/or the public key generated at the service provider 102 (SP_public_key) may be hard coded into the component(s) 124.

In examples, operation 204 is performed when the component(s) 124 is booted for the first time. For example, the component(s) 124 may perform operation 204 to associate the component(s) 124 with the service provider 102. Upon performing operation 204, communication between the component(s) 124 and the service provider 102 may be encrypted/decrypted using the static cryptographic key (original static key) until a further cryptographic key is designated. In examples, the static cryptographic key (original static key) may be used at the Transmission Control Protocol (TCP) layer, such as when the component(s) 124 is a NIC. Although the static cryptographic key (original static key) may be used at other layers and/or in other manners. In examples, the component(s) 124 may communicate with just the service provider 102 upon performing operation 204, since the static cryptographic key (original static key) is now designated for secure communication with the service provider 102 and other cryptographic keys may not have been designated for communication with other entities.

At 206, the TEE component 128 may store a cryptographic key(s), such as the cryptographic key(s) 132. For example, the TEE component 128 may store the public cryptographic key generated at the service provider 102 (SP_public_key). In examples, the public cryptographic key (SP_public_key) may be hard coded into the TEE component 128. For instance, in cases where the TEE component 128 is implemented at least in part as an application, the public cryptographic key (SP_public_key) may be hard coded into the application when the application is being written.

In the example of FIG. 2, operations 202-206 may be part of a configuration stage. During the configuration state, one or more cryptographic keys may be configured within the service provider 102, the component(s) 124, and/or the TEE component 128, as discussed above. In examples, the configuration stage may include connecting the component(s) 124 to the system 104, writing an application that at least partly implements the TEE component 128, etc. However, any of operations 202-206 may be performed at any time.

At 208, the service provider 102 and the TEE component 128 may perform remote attestation. For example, the TEE component 128 may authenticate its hardware/software configuration to the service provider 102 using an attestation service, such as a trusted third-party. Once authenticated, the service provider 102 (and/or the TEE component 128) may provide a session cryptographic key (sometimes referred to as "sk") to use for communication between the service provider 102 and the TEE component 128. As such, the service provider 102 and the TEE component 128 may negotiate to establish a secure communication channel (e.g., the session cryptographic key to use for communication over the secure communication channel 130).

In examples, the session cryptographic key (sk) may be used at the application layer, such as when the TEE component 128 is implemented at least in part as an application. Although the session cryptographic key (sk) may be used at other layers and/or in other manners. As such, in examples, communication between the system 104 and the service provider 102 may be encrypted/decrypted at least twice (e.g., encrypted/decrypted with the session key (sk) at the application layer and encrypted/decrypted with the static cryptographic key (original static key) or anther cryptographic key (e.g., rotated static key, as discussed below) at the TCP layer.

At 210, the service provider 102 may send a key package to the TEE component 128 using the session cryptographic key (e.g., via the secure communication channel 130). For example, the key package may be encrypted using the session cryptographic key (sk). The key package may include: (i) a static cryptographic key (sometime referred to as "rotated static key") generated by the service provider 102, (ii) a system cryptographic key(s) mapped to a system(s) (sometimes referred to as an "ephemeral key(s)") generated by the service provider 102, (iii) map data indicating a mapping of the system cryptographic key(s) to the system(s), (iv) a public cryptographic key generated by the component(s) 124 (NIC_public_key), and/or (v) a signed hash of the static cryptographic key (rotated static key), the map data, and the public cryptographic key (NIC_public_key). The signed hash may be signed by the private cryptographic key generated by the service provider 102 (SP_private_key). In examples, the service provider 102 may update the static cryptographic key (rotated static key), such as periodically (e.g., each day, month, week, etc.), upon the occurrence of an event, and/or at any other time.

At 212, the TEE component 128 may receive the key package from the service provider 102. In examples where the key package is encrypted with the session cryptographic key (sk), the TEE component 128 may decrypt the key package to identify the data within the key package. In examples, the TEE component 128 may calculate a hash of data within the key package, such as a hash of the static cryptographic key (rotated static key), the map data, and the public cryptographic key (NIC_public_key) (e.g., items (i), (iii), and (iv) of the key package). In examples, the signed hash within the key package is encrypted using a private cryptographic key (SP_private_key). Here, the corresponding public cryptographic key (SP_public_key) is used to decrypt the signed hash to obtain the hash. Then, the calculated hash may be compared to the decrypted hash from the key package. If verified, the TEE component 128 may trust the key package and data within the key package (e.g., store and/or use the data for further processing).

At 214, the TEE component 128 may generate a symmetric cryptographic key (sometimes referred to as "s-n key") and/or send the symmetric cryptographic key to the component(s) 124. In examples, the symmetric cryptographic key (s-n key) may be a randomly generated key. Further, in examples, the symmetric cryptographic key (s-n key) may be encrypted using the public cryptographic key (NIC_public_key), and then, sent to the component(s) 124. In examples, such use of the public cryptographic key (NIC_public_key) may facilitate a first secure communication channel. In examples, the first secure communication channel is associated with an asymmetric key (RSA) encryption. Here, once a second secure communication channel is established as discussed below, the TEE component 128 and the component(s) 124 no longer use the first secure communication channel because the asymmetric key (RSA) based secure channel may have a larger computing overhead as opposed to symmetric key based secure channel (which may be used for the second secure communication channel established between the TEE component 128 and the component(s) 124).

At 216, the component(s) 124 may receive the symmetric cryptographic key (s-n key) and/or decrypt the encrypted symmetric cryptographic key (s-n key). In examples, the component(s) 124 may use the private cryptographic key (NIC_private_key) to decrypt the data received from the TEE component 128 to identify the symmetric cryptographic key (s-n key). If the decryption occurs with the private cryptographic key (NIC_private_key), the component(s) 124 may trust the TEE component 128 (e.g., store and/or use the symmetric cryptographic key (s-n key) for further communication) and/or proceed to operation 218.

At 218, the component(s) 124 may encrypt the public cryptographic key (NIC_public_key) using the symmetric cryptographic key (s-n key) and/or send the public cryptographic key (NIC_public_key) to the TEE component 128 (e.g., in an encrypted format).

At 220, the TEE component 128 may receive the public cryptographic key (NIC_public_key) and/or decrypt the encrypted public cryptographic key (NIC_public_key). In examples, the TEE component 128 may use the symmetric cryptographic key (s-n key) to decrypt the data received from the component(s) 124 to identify the public cryptographic key (NIC_public_key). The TEE component 128 may then compare the public cryptographic key (NIC_public_key) received from the component(s) 124 to the public cryptographic key (NIC_public_key) stored at the TEE component 128 (e.g., received from the service provider 102). If the cryptographic keys match, the TEE component 128 may trust the component(s) 124 (e.g., determine that the component(s) 124 is verified) and/or proceed to operation 222.

At 222, the TEE component 128 may send a key package to the component(s) 124. The key package may include data received from the service provider 102. For example, the key package may include: (i) the static cryptographic key (rotated static key) generated by the service provider 102, (ii) the system cryptographic key(s) mapped to the system(s) (ephemeral key(s)) generated by the service provider 102, (iii) the map data, (iv) the public cryptographic key generated by the component(s) 124 (NIC_public_key), and/or (v) a signed hash of the static cryptographic key (rotated static key), the map data, and the public cryptographic key (NIC_public_key). The signed hash may be signed by the private cryptographic key generated by the service provider 102 (SP_private_key). In examples, the key package may be encrypted with the symmetric cryptographic key (s-n key).

At 224, the component(s) 124 may receive the key package from the TEE component 128. In examples, the component(s) 124 may use the symmetric cryptographic key (s-n key) to decrypt the key package. In examples, the component(s) 124 may calculate a hash of data within the key package, such as a hash of the static cryptographic key (rotated static key), the map data, and the public cryptographic key (NIC_public_key) (e.g., items (i), (iii), and (iv) of the key package). In examples, the signed hash within the key package is encrypted using a private cryptographic key (SP_private_key). Here, the corresponding public cryptographic key (SP_public_key) is used to decrypt the signed hash to obtain the hash. Then, the calculated hash may be compared to the decrypted hash from the key package. If verified, the component(s) 124 may trust the key package and data within the key package (e.g., store and/or use the data for further processing).

In the example of FIG. 2, operations 208-224 may be part of an initialization stage. During the initialization stage, one or more cryptographic keys may be distributed to different entities in a secure manner, as discussed above. In examples, the initialization stage may include setting up the system 104, the system 106, and/or the service provider 102 (e.g., grouping the system 104 with the system 106 and/or associating the system 104 and/or the system 106 with the service provider 102), executing the TEE component 128 for the first time (e.g., after the devices are connected to fiber/ethernet), etc. However, any of operations 208-224 may be performed at any time.

Figure 3:
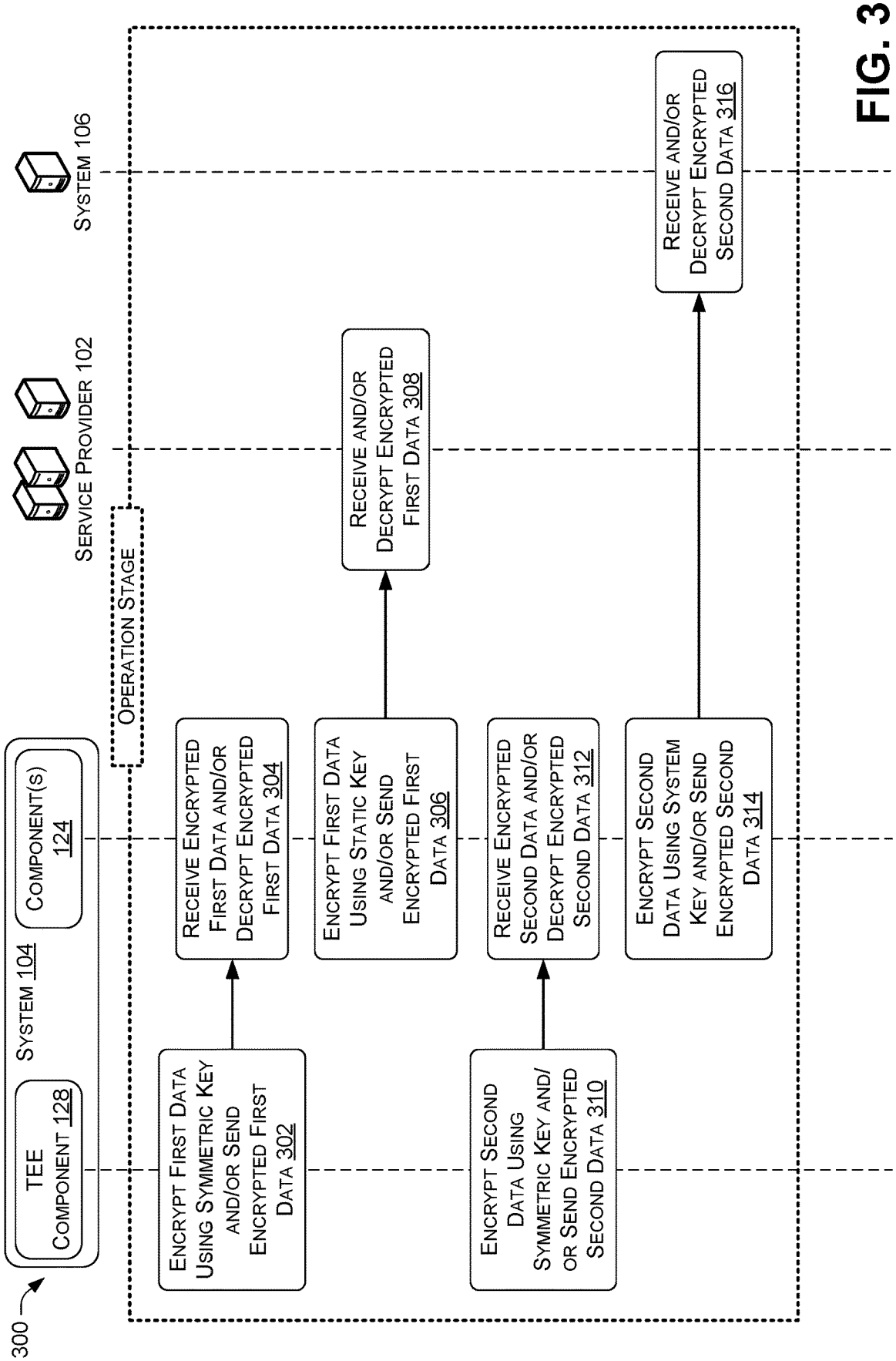
FIG. 3 illustrates an example process to provide data over a secure channel.

FIG. 3 illustrates an example process 300 to provide data over a secure channel. For ease of illustration, the term "key" is used in FIG. 3 to represent a cryptographic key. In examples, the process 300 may be performed after performing the process 200.

At 302, the TEE component 128 may encrypt first data using a symmetric cryptographic key (s-n) and/or send the encrypted first data to the component(s) 124. In examples, the symmetric cryptographic key (s-n) may be designated for communication between the TEE component 128 and the component(s) 124. As such, the TEE component 128 may send data to the component(s) 124 using a secure communication channel. In examples, the first data may be encrypted with the session cryptographic key (sk) before being encrypted with the symmetric cryptographic key (s-n), since the first data is destined for the service provider 102 and the session cryptographic key (sk) is designated for such communication with the service provider 102.

At 304, the component(s) 124 may receive the encrypted first data from the TEE component 128 and/or decrypt the encrypted first data. For example, the component(s) 124 may decrypt the encrypted first data with the symmetric cryptographic key (s-n).

At 306, the component(s) 124 may encrypt the first data using a static cryptographic key (rotated static key) and/or send the encrypted first data to the service provider 102. In examples, the static cryptographic key (rotated static key) may be designated for communication between the component(s) 124 and the service provider 102.

At 308, the service provider 102 may receive the encrypted first data and/or decrypt the encrypted first data. For example, the service provider 102 may decrypt the encrypted first data with the static cryptographic key (rotated static key). In examples, the service provider 102 may also decrypt the first data with the session cryptographic key (sk).

At 310, the TEE component 128 may encrypt second data using the symmetric cryptographic key (s-n) and/or send the encrypted second data to the component(s) 124.

At 312, the component(s) 124 may receive the encrypted second data from the TEE component 128 and/or decrypt the encrypted second data. For example, the component(s) 124 may decrypt the encrypted second data with the symmetric cryptographic key (s-n).

At 314, the component(s) 124 may encrypt the second data using a system cryptographic key (ephemeral key) designated for communication with the system 106 and/or send the encrypted second data to the service provider 102. In examples, the component(s) 124 may use map data to identify the system cryptographic key that is associated with the system 106.

At 308, the system 106 may receive the encrypted second data and/or decrypt the encrypted second data. For example, the system 106 may decrypt the encrypted second data with the system cryptographic key (ephemeral) associated with the system 106.

In the example of FIG. 3, operations 302-316 may be part of an operation stage. During the operation stage, data may be sent over a secure channel to various entities (e.g., at runtime of the TEE component 128 or other entities). However, any of operations 302-316 may be performed at any time.

Although not illustrated in FIG. 3, in examples, data may be received at the system 104 and/or decrypted. For example, the component(s) 124 may receive data from the service provider 102 and/or the system 106. The component(s) 124 may decrypt the data with the appropriate cryptographic key (e.g., the static cryptographic key (rotated static key) associated with the service provider 102 and/or the system cryptographic key (ephemeral) associated with the system 106). The component(s) 124 may then send the data to the TEE component 128 using the symmetric cryptographic key (s-n).

Figure 4:
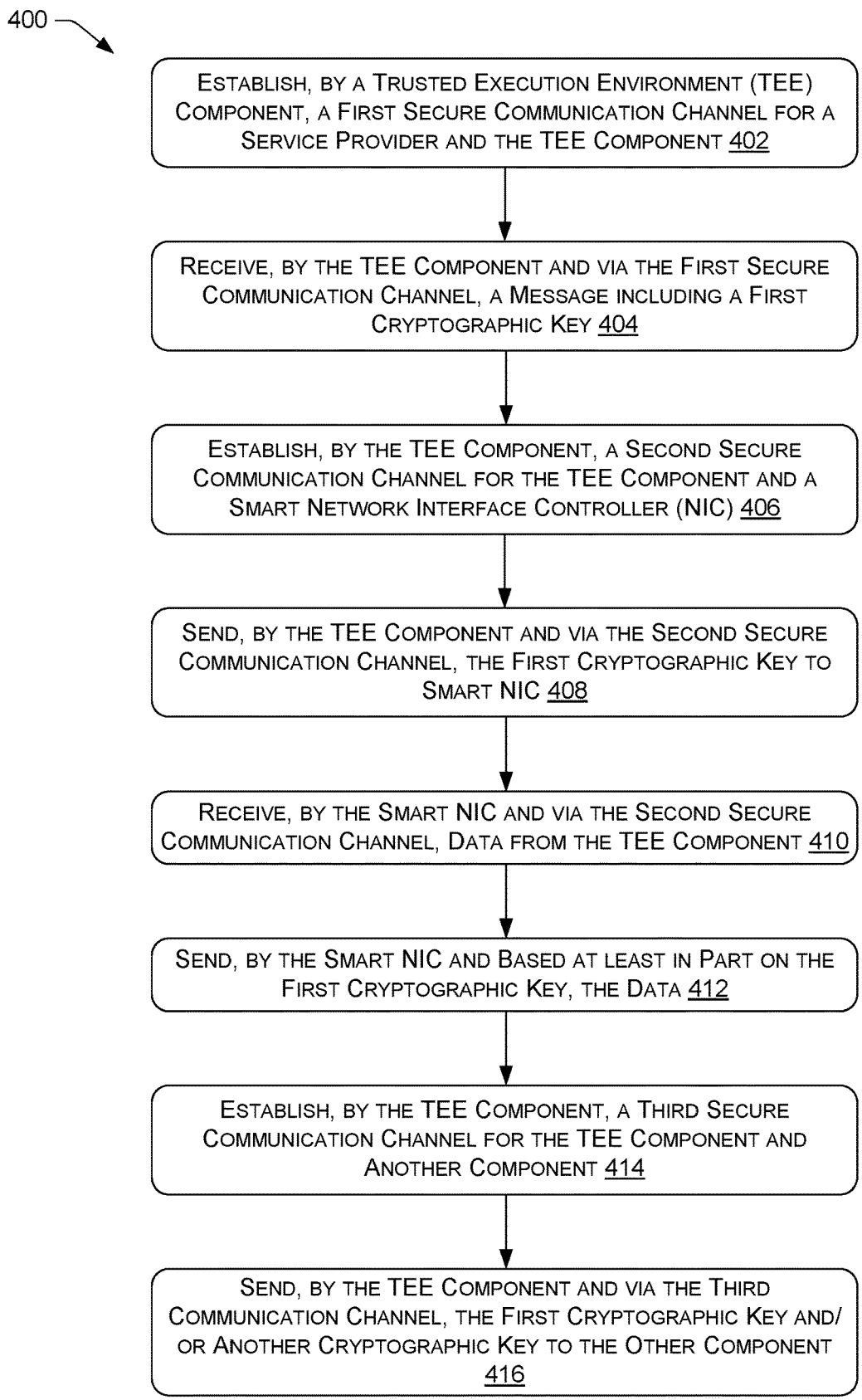
FIG. 4 illustrates an example process to establish a secure communication channel between a Trusted Execution Environment (TEE) component and a smart Network Interface Controller (NIC) and provide data over the secure communication channel.

FIG. 4 illustrates the example process 400 to establish a secure communication channel between a Trusted Execution Environment (TEE) component and a smart Network Interface Controller (NIC) and provide data over the secure communication channel.

At 402, a TEE component may establish a first secure communication channel for a service provider and the TEE component. For example, the TEE component and the service provider may perform remote attestation to designate/negotiate a cryptographic key (e.g., session key) for encrypting and/or decrypting communication between the TEE component and the service provider.

At 404, the TEE component may receive, via the first secure communication channel, a message from the service provider. The message may be encrypted using the cryptographic key designated for communication on the first secure communication channel. The message may include a first cryptographic key (e.g., a rotated static key, an ephemeral key(s), etc.), map data, a public cryptographic key (e.g., for a smart Network Interface Controller (NIC) and associated with the service provider), a signed hash, and so on. The first cryptographic key may be designated for communication with the service provider, another system, etc. In examples, the message may be a key package.

At 406, the TEE component may establish a second secure communication channel for the TEE component and a smart Network Interface Controller (NIC). For example, the TEE component may communicate with the smart NIC to designate/establish a second cryptographic key (e.g., a symmetric key generated by the TEE component) for encrypting and/or decrypting communication between the TEE component and the smart NIC. In one example, the TEE component may generate the second cryptographic key, encrypt the second cryptographic key to generate encrypted data, and/or send the encrypted data to the smart NIC. The smart NIC may decrypt the encrypted data to identify the second cryptographic key.

At 408, the TEE component may send, via the second secure communication channel, the first cryptographic key to the smart NIC. For example, the first cryptographic key (e.g., a rotated static key, an ephemeral key(s), etc.) may be encrypted with the second cryptographic key (e.g., symmetric key) and sent to the smart NIC.

At 410, the smart NIC may receive, via the second secure communication channel, data from the TEE component. For example, the data may be received as encrypted data that is encrypted with the second cryptographic key (e.g., a symmetric cryptographic key).

At 412, the smart NIC may send, based at least in part on the first cryptographic key, the data to the service provider or a system. For example, the smart NIC may decrypt the received data based at least in part on the second cryptographic key (e.g., a symmetric key), encrypt the data based at least in part on the first cryptographic key (e.g., a rotated static key, ephemeral key, etc.) to generate encrypted data, and send the encrypted data to the service provider or the other system.

At 414, the TEE component may establish a third secure communication channel for the TEE component and another component (e.g., a component on a system other than the smart NIC). For example, the TEE component may communicate with the other component (e.g., GPU, a video card, a digital signal processor, a camera, etc.) to designate/establish a cryptographic key (e.g., the same symmetric key, an additional symmetric key, etc.) for encrypting and/or decrypting communication between the TEE component and the other component.

At 416, the TEE component may send, via the third communication channel, the first cryptographic key or another cryptographic key to the other component. In one example, the TEE component may identify another cryptographic key (e.g., a symmetric key) that is provisioned by the service provider for use by the other component. The TEE component may have received the other cryptographic key in the message from the service provider or otherwise. The TEE component may provide the other cryptographic key to the other component in a secure manner over the third secure communication channel. In another example, the TEE component may provide the first cryptographic key to the other component to use when communicating with the service provider, another system, etc. For instance, the other component may be an additional smart NIC on a system that includes the smart NIC.

Figure 5:
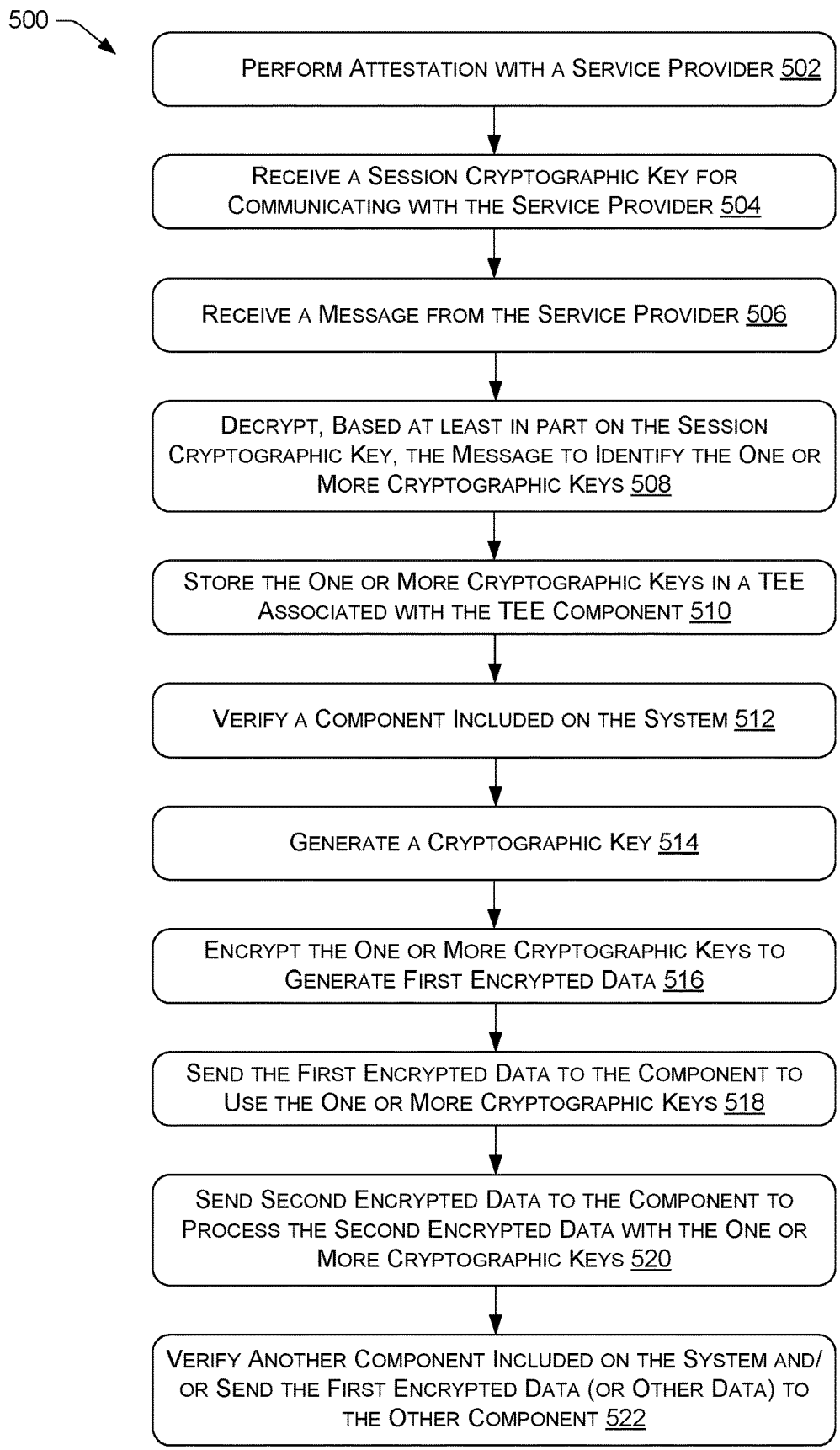
FIG. 5 illustrates an example process to securely provide a cryptographic key to a component on a system.

FIG. 5 illustrates the example process 500 to securely provide a cryptographic key to a component on a system.

At 502, a Trusted Execution Environment (TEE) component of a system may perform attestation with a service provider. For example, the TEE component and/or the service provider may communicate with an attestation service to perform remote attestation.

At 504, the TEE component may receive a session cryptographic key for communicating with the service provider. For example, the TEE component and the service provide may establish a cryptographic key to use for communication, such as a session cryptographic key. In examples, operation 504 may be performed upon and/or as part of performing attestation with the service provider.

At 506, the TEE component may receive a message from the service provider. The message may include one or more cryptographic keys, such as a static cryptographic key for communication with the service provider, an ephemeral cryptographic key for communication with another system, etc. In examples, the message is a key package and/or is encrypted with the session cryptographic key. Further, in examples, the system comprises a first server of a group of servers and the other system comprises a second server of the group of servers.

At 508, the TEE component may decrypt, based at least in part on the session cryptographic key, the message (when encrypted) to identify the one or more cryptographic keys.

At 510, the TEE component may store the one or more cryptographic keys in a TEE associated with the TEE component.

At 512, the TEE component may verify a component included on the system. For example, the TEE component may communicate with the component to exchange data, such as a cryptographic key, and verify that the component is not compromised, is authentic, etc. The component may comprise a smart Network Interface Controller (NIC), a Graphics Processing Unit (GPU), a secure cryptoprocessor, a video card, a digital signal processor, a camera, an audio codec, and so on.

At 514, the TEE component may generate a cryptographic key. For example, the TEE component may generate a symmetric cryptographic key to use for communication between the TEE component and the component. The TEE component may send the cryptographic key to the component.

At 516, the TEE component may encrypt the one or more cryptographic keys to generate first encrypted data. For example, based on verifying the component at 512, the TEE component may encrypt the one or more cryptographic keys identified at 508 using the cryptographic key generated at 514 (e.g., the symmetric cryptographic key) to generate the first encrypted data.

At 518, the TEE component may send the first encrypted data to the component to use the one or more cryptographic keys. In examples, the first encrypted data may be sent based on verifying the component at 512.

At 520, the TEE component may send second encrypted data to the component to process the second encrypted data with the one or more cryptographic keys. For example, during runtime, the TEE component may send data to the component that is encrypted with the cryptographic key generated at 514 (e.g., the symmetric cryptographic key). The component may decrypt the data with the cryptographic key generated at 514 (e.g., the symmetric cryptographic key), encrypt the data with the one or more cryptographic keys, and send the data onto another device.

At 522, the TEE component may verify another component included on the system and/or send the first encrypted data (or other data) to the other component to use the one or more cryptographic keys included in the first encrypted data.

Figure 6:
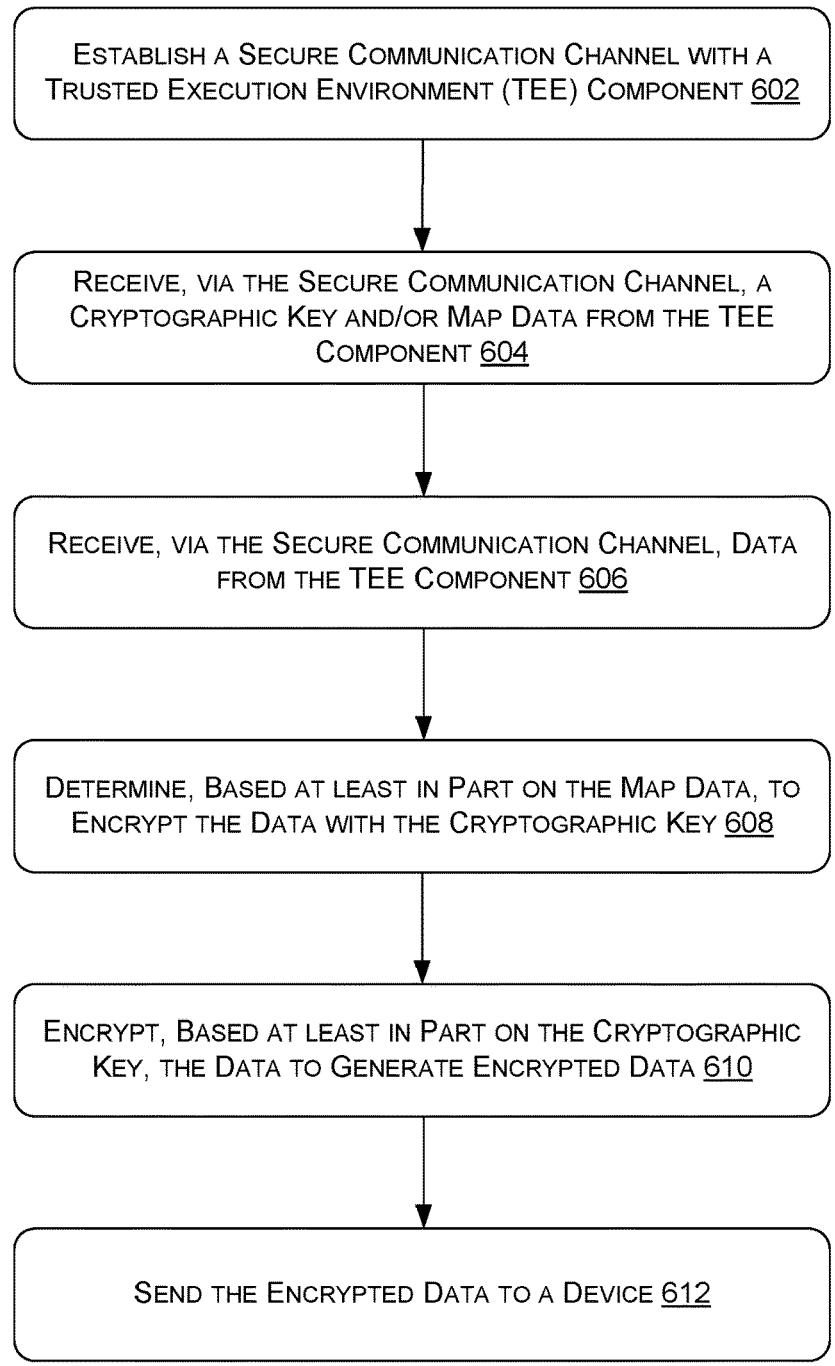
FIG. 6 illustrates an example process to establish a secure communication channel with a Trusted Execution Environment (TEE) component and receive a cryptographic key from the TEE component.

FIG. 6 illustrates the example process 600 to establish a secure communication channel with a Trusted Execution Environment (TEE) component and receive a cryptographic key from the TEE component.

At 602, a Network Interface Controller (NIC) may establish a secure communication channel with a TEE component.

At 604, the NIC may receive, via the secure communication channel, a cryptographic key and/or map data from the TEE component. In examples, the cryptographic key and/or the map data may be received as encrypted data that is encrypted based at least in part on another cryptographic key that is associated with the secure communication channel. Once received, the NIC may decrypt the encrypted data to identify the cryptographic key and/or map data and/or store the cryptographic key and/or map data.

At 606, the NIC may receive, via the secure communication channel, data from the TEE component. In examples the data may be received as encrypted data that is encrypted with another cryptographic key that is associated with communication to a device, such as a session cryptographic key that is associated with communication with a service provider.

At 608, the NIC may determine, based at least in part on the map data, to encrypt the data with the cryptographic key (received at 604). For example, the NIC may determine that the data is designated to be sent to a particular device and determine, based on the map data, a cryptographic key that is associated with the particular device. Although discussed in the context of using map data, in some instances the NIC may determine the cryptographic key to use without reference to the map data.

At 610, the NIC may encrypt, based at least in part on the cryptographic key (received at 604), the data to generate encrypted data.

At 612, the NIC may send the encrypted data to a device, such as a service provider, a system, etc. In examples, the data is encrypted with a cryptographic key that is generated and/or provided by the device.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   establishing, by a Trusted Execution Environment (TEE) component that is implemented by a system that includes one or more processors, a first secure communication channel for a service provider and the TEE component;
   receiving, by the TEE component and via the first secure communication channel, a message from the service provider, the messages including a first cryptographic key;
   establishing, by the TEE component, a second secure communication channel secured by a third cryptographic key for the TEE component and a smart Network Interface Controller (NIC) included on the system; and
   sending, by the TEE component and via the second secure communication channel, the first cryptographic key and map data to the smart NIC, wherein the map data configures the smart NIC to securely communicate with the service provider or another system based at least in part on the first cryptographic key, and to securely communicate with other systems without the first cryptographic key.

2. The method of claim 1, further comprising:
   receiving, by the smart NIC and via the second secure communication channel, data from the TEE component; and
   sending, by the smart NIC and based at least in part on the first cryptographic key, the data to at least one of the service provider or another system.

3. The method of claim 2, wherein:
   establishing the first secure communication channel comprises establishing a second cryptographic key for at least one of encrypting or decrypting communication between the TEE component and the service provider; and
   establishing the second secure communication channel comprises establishing a third cryptographic key for at least one of encrypting or decrypting communication between the TEE component and the smart NIC.

4. The method of claim 3, wherein:
   receiving the data from the TEE component comprises receiving, by the smart NIC and via the second secure communication channel, the data as first encrypted data, the first encrypted data being encrypted with the third cryptographic key; and
   sending the data to at least one of the service provider or the other system comprises:
   decrypting, by the smart NIC and based at least in part on the third cryptographic key, the first encrypted data to identify the data;
   encrypting, by the smart NIC, the data based at least in part on the first cryptographic key to generate second encrypted data; and sending, by the smart NIC, the second encrypted data to at least one of the service provider or the other system.

5. The method of claim 3, wherein establishing the third cryptographic key for at least one of encrypting or decrypting communication between the TEE component and the smart NIC comprises:
generating, by the TEE component, the third cryptographic key;
encrypting the third cryptographic key to generate encrypted data;
sending, by the TEE component, the encrypted data to the smart NIC; and
decrypting, by the smart NIC, the encrypted data to identify the third cryptographic key.

6. The method of claim 1, further comprising:
establishing, by the TEE component, a third secure communication channel for the TEE component and another component included on the system; and
sending, by the TEE component and via the third secure communication channel, at least one of the first cryptographic key or a second cryptographic key to the other component.

7. A system comprising:
one or more processors; and
memory storing executable instructions that when executed by the one or more processors, cause the one or more processors to perform operations within a Trusted Execution Environment (TEE), the operations comprising:
performing attestation with a service provider;
receiving a message from the service provider, the message including one or more cryptographic keys;
verifying a component included on the system;
based at least in part on verifying the component:
encrypting the one or more cryptographic keys and map data to generate first encrypted data; and
sending the first encrypted data to the component to configure the component, by the map data, to securely communicate with the service provider or another system using the one or more cryptographic keys and to securely communicate with other systems without using the one or more cryptographic keys; and
sending second encrypted data to the component to process the second encrypted data with the one or more cryptographic keys.

8. The system of claim 7, wherein the component comprises a smart Network Interface Controller (NIC).

9. The system of claim 7, wherein the component comprises at least one of a Graphics Processing Unit (GPU), a secure cryptoprocessor, a video card, a digital signal processor, a camera, or an audio codec.

10. The system of claim 7, wherein the message comprises an encrypted message, and the operations further comprise:
upon performing the attestation with the service provider, receiving a session cryptographic key for communicating with the service provider;
decrypting, based at least in part on the session cryptographic key, the encrypted message to identify the one or more cryptographic keys; and
storing the one or more cryptographic keys in the TEE.

11. The system of claim 7, wherein the one or more cryptographic keys include a static cryptographic key for communication with the service provider.

12. The system of claim 7, wherein the one or more cryptographic keys include an ephemeral cryptographic key for communication with another system.

13. The system of claim 12, wherein the system comprises a first server of a group of servers and the other system comprises a second server of the group of servers.

14. The system of claim 7, wherein:
the operations further comprise generating, as a generated cryptographic key, a cryptographic key;
the first encrypted data is encrypted based at least in part on the generated cryptographic key; and
the second encrypted data is encrypted based at least in part on the generated cryptographic key.

15. The system of claim 7, wherein the operations further comprise:
verifying another component included on the system; and
sending the first encrypted data to the other component to use the one or more cryptographic keys included in the first encrypted data.

16. A Network Interface Controller (NIC) comprising:
one or more hardware logic components; and
memory storing executable instructions that when executed by the one or more hardware logic components, cause the one or more hardware logic components to perform operations comprising:
establishing a secure communication channel with a Trusted Execution Environment (TEE) component;
receiving, via the secure communication channel, a cryptographic key and map data from the TEE component, the map data configuring the one or more hardware logic components to securely communicate with a first device based at least in part on the cryptographic key, and to securely communicate with other devices without the cryptographic key;
receiving, via the secure communication channel, data from the TEE component;
encrypting, based at least in part on the cryptographic key, the data to generate encrypted data; and
sending the encrypted data to a device.

17. The NIC of claim 16, wherein:
receiving the data from the TEE component comprises receiving the data as first encrypted data, the first encrypted data being encrypted with another cryptographic key that is associated with communication to the device, the device comprising a service provider;
encrypting the data comprises encrypting, based at least in part on the cryptographic key, the first encrypted data to generate second encrypted data; and
sending the encrypted data comprises sending the second encrypted data to the service provider.

18. The NIC of claim 16, wherein the cryptographic key comprises a cryptographic key that is generated by the device.

19. The NIC of claim 16, wherein the device comprises a server within a group of servers, and the operations further comprise:
receiving map data from the TEE component, the map data indicating that the device is associated with the cryptographic key; and
based at least in part on the map data, determining to encrypt the data with the cryptographic key.

20. The system of claim 16, wherein receiving the cryptographic key comprises receiving the cryptographic key as encrypted data that is encrypted based at least in part on another cryptographic key that is associated with the secure communication channel, and the operations further comprise:

decrypting the encrypted data to identify the cryptographic key; and storing the cryptographic key.

\* \* \* \* \*